(12) United States Patent (10) Patent No.: US 9,097,394 B2
Lauret et al. (45) Date of Patent: Aug. 4, 2015

(54) LED RUNWAY LIGHTING ASSEMBLY AND DEDICATED OPTICAL DEVICE

(71) Applicant: ECE, Paris (FR)

(72) Inventors: Jean-Pierre Lauret, Oyonnax (FR); Christian Tsao, Rosny Sous Bois (FR)

(73) Assignee: ECE, Paris (FR)

( * ) Notice: Subject to any disclaimer, the term of this patent is extended or adjusted under 35 U.S.C. 154(b) by 0 days.

(21) Appl. No.: 13/918,561

(22) Filed: Jun. 14, 2013

(65) Prior Publication Data

US 2013/0335979 A1 Dec. 19, 2013

(30) Foreign Application Priority Data

Jun. 14, 2012 (FR) ...................................... 12 55578

(51) Int. Cl.
| | |
|---|---|
| *F21V 3/00* | (2015.01) |
| *F21V 5/00* | (2015.01) |
| *F21K 99/00* | (2010.01) |
| *F21V 5/04* | (2006.01) |
| *F21W 111/06* | (2006.01) |
| *F21Y 101/02* | (2006.01) |

(52) U.S. Cl.
CPC . *F21K 9/50* (2013.01); *F21V 5/045* (2013.01); *F21W 2111/06* (2013.01); *F21Y 2101/02* (2013.01)

(58) Field of Classification Search
CPC ....... F21K 9/50; F21V 5/045; F21Y 2101/02; F21W 2111/06
See application file for complete search history.

(56) References Cited

U.S. PATENT DOCUMENTS

| | | | | |
|---|---|---|---|---|
| 7,378,991 | B2 * | 5/2008 | Dietz et al. ...................... | 341/22 |
| 2006/0126353 | A1 * | 6/2006 | Ishida ............................. | 362/543 |
| 2007/0064438 | A1 * | 3/2007 | Ishida ............................. | 362/516 |
| 2008/0316763 | A1 * | 12/2008 | Albou ............................ | 362/538 |

* cited by examiner

*Primary Examiner* — Donald Raleigh
(74) *Attorney, Agent, or Firm* — Meyertons, Hood, Kivlin, Kowert & Goetzel, P.C.; Eric B. Meyertons

(57) ABSTRACT

A lighting device includes a light source and an optical element, the light source includes a plurality of light emitting diodes aligned. The optical element being shaped to focus a light beam emitted by the light source in a plane orthogonal to the line of light emitting diodes and to deflect said light beam parallel to an illuminating plane including the line of light emitting diodes so as to form a light beam having an ellipsoidal section.

7 Claims, 2 Drawing Sheets

LED RUNWAY LIGHTING ASSEMBLY AND DEDICATED OPTICAL DEVICE

BACKGROUND

1. Field

The invention relates to a lighting assembly including light emitting diodes as light source. In particular, the invention relating to an outdoor lighting device that can be used for an aircraft.

2. Description of the Related Art

An aircraft generally has several outdoor lighting devices for illuminating outdoor areas while the aircraft is in motion on the ground or in the air. An aircraft may include landing lights located on the wings and used to illuminate the landing runway when the aircraft is approaching the runway or during the take-off, a flashing anti-collision light mounted on the top of the rear spoiler, and navigation lights mounted on the tip of each wing. An aircraft may also include taxi type lighting devices mounted on the nose of the aircraft to illuminate the track on which the aircraft is travelling when he is moving on the ground, and additional lighting devices called "runway turn-off lights" (RTO).

The taxi type and runway turn-off type track lighting devices are intended to help the crew visualize the curves in the taxiways and runways towards the front and in the turns. The taxi lighting devices are generally mounted on the front landing gear and are intended to illuminate in front of the aircraft, while the runway turn-off lighting devices are generally mounted on the front landing gear or on the front of the wings and oriented on each side of the front of the aircraft with angles of between approximately 35° to 55° in order to illuminate the curves and thus improve the visibility while turning.

These track lighting devices must provide a relatively powerful beam over a distance of about 30 m in front the aircraft with a light beam extending laterally in a horizontal plane, i.e. relatively parallel to the wings plane taking into account the dihedral angle, but concentrated in a vertical plane, that is, relatively orthogonal to the wings of the aircraft taking into account the dihedral angle. Indeed, only the illumination of the track in a turn or curve is necessary.

The track lighting devices generally include as a light source an incandescent light bulb generating a light beam in every direction from the filament and a mirror redirecting a portion of the light beam forwardly. An incandescent light bulb may be very fragile when the filament is heated, reducing its lifetime. Moreover, the amount of electric power consumed for operating the filament and therefore emitting the light beam may be significant.

SUMMARY

Systems and methods of providing light are disclosed. In various embodiments, a lighting device is provided using light emitting diodes (LED) as the light source, and a specific optical device adapted to the light source in order to generate a light beam with an illumination pattern meeting the needs of pilots to see the runway on a wider angle. In an embodiment, a lighting device includes a light source and an optical element, the light source includes a plurality of light emitting diodes aligned. The optical element being shaped to focus a light beam emitted by the light source in a plane orthogonal to the line of light emitting diodes and to deflect said light beam parallel to an illuminating plane including the line of light emitting diodes so as to form a light beam having an ellipsoidal section.

BRIEF DESCRIPTION OF THE DRAWINGS

Other advantages and features of the invention will appear on examination of the description of detailed embodiments of the invention that is in no way limiting, and the appended drawings, in which.

Figure 1:
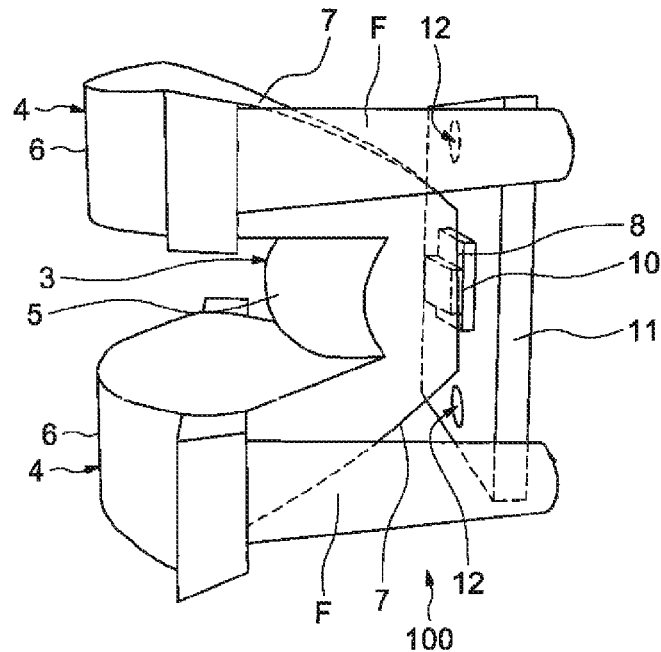
FIG. 1 illustrates a perspective view of a lighting device according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In an embodiment, a lighting device includes a light source and an optical element, the light source includes a plurality of light emitting diodes aligned. The optical element being shaped to focus a light beam emitted by the light source in a plane orthogonal to the line of light emitting diodes and to deflect said light beam parallel to an illuminating plane including the line of light emitting diodes so as to form a light beam having an ellipsoidal section.

In some embodiments, the device can includes a light source having several lines of light emitting diodes so as to obtain a light beam having a length in the illuminating plane greater than in the plane orthogonal to the illuminating plane. In this configuration, the dimensions of the optical element may be more important than in the case of light source having one line of LEDs.

Using LEDS as light source allows having a light beam consuming less electric power than an incandescent light bulb and whose service life is greater than that of the incandescent light bulb. Moreover, a LED may not be as sensitive to vibrations as a bulb comprising a filament.

The small size of LEDs may allow first to reduce the amount of space used, and secondly to use a plurality of LEDs and to align them in order to form a line segment. Such an arrangement allows having right from the entry of the optical assembly a light beam extending substantially in a preferred direction, for example, in the illuminating plane comprising the LEDs. The light beam emitted by the LEDs is more directional than the light beam of an incandescent light bulb.

As the light source comprises a plurality of aligned LEDs, the associated optical element may be adapted at least to the light beam emitted by all the LEDs.

In an embodiment, the optical element includes an entrance surface and at least two output surfaces, and has a general converging lens shape in the orthogonal plane.

The illuminating plane may correspond to the plane comprising the LEDs and extending forwardly of said LEDs. For a lighting device dedicated to illuminating ways or tracks, on the side and in front of the plane, the optical assembly may deflect the light beam so as to project the light beam substantially on the track and on a surface relatively wide in front and/or around the plane. The light beam may have an ellipsoidal section with a large radius extending in the illuminating plane and a small radius extending in the plane orthogonal to the illuminating plane. The optical assembly therefore may correspond to a converging lens in the orthogonal plane.

The optical element may include preferably a central optical portion and two peripheral optical portions arranged on either side of the central optical portion in the orthogonal plane.

The two peripheral optical portions arranged on either side of the central optical portion in the orthogonal plane may focus the light beam in the orthogonal plane so as to increase the power of the light beam.

Advantageously, the central optical portion may include a central output surface having an aspherical torus shape in the illuminating plane and capable of transmitting the light beam.

Therefore, the central optical portion may have a shape close to that of a portion of a sphere but is not strictly spherical. Lenses of traditional shape generally have a spherical shape, which leads to optical aberration. Indeed, for example, the rays passing through the center do not all converge at the same spot that the ones passing through the edges converge at. An aspherical lens is not affected by such phenomenon.

In addition, the torus-shaped lens allows to strongly focus the light beam in the orthogonal plane, for example from 180° to around 10°, and to converge slightly less, for example from 180° to around 50°, the light beam in the illuminating plane so as to maintain a certain light power.

Advantageously, each peripheral optical portion may include a peripheral output surface having a cylindrical convergent lens shape in a plane parallel to the illuminating plane and capable of transmitting the light beam, and a semi-parabolic reflective surface in the orthogonal plane capable of reflecting the light beam from the light source towards the peripheral output surface, the reflective surfaces of the two peripheral optical portions together forming a parabolic reflecting lens.

Each peripheral optical portion may include a semi-parabolic reflective surface extending between the light source and the corresponding peripheral output surface, allowing to reflect the light rays emitted towards the peripheral output surface and to focus the light beam in the orthogonal plane and to increase the power the of the light beam illuminating the way or the track. The cylindrical diopter shape of the output surfaces may enable convergence of the light beam in the illuminating plane so as to maintain a certain light power, and to deflect as little as possible the light rays in the orthogonal plane, the light rays having already been deflected by the reflective surfaces so as to strongly converge the light beam.

The optical assembly includes complex output surfaces and more particularly extruded output surfaces, for example, output surfaces which are not axisymmetric unlike standard optics which are. These extruded surfaces may have prismatic shapes which allow having an elliptical beam. They allow obtaining distinct beam widths in the illuminating plane, for example a width, or an aperture, greater than 35° and preferably greater than 40°, and in the orthogonal plane, for example a beam width between 5° and 20°, and more particularly between 7° and 14°.

The entrance surface may advantageously have a cylindrical surface in the illuminating plane so that the light beam emitted by the light source is deflected as little as possible.

According to another aspect, what is also proposed is a light assembly including a plurality of lighting devices as defined above aligned in the orthogonal plane.

The small size of the light source may allow using a smaller optical assembly and therefore allow a strongly reduction in the amount of space used by the lighting device. This allows combining several lighting devices to increase the light power and the dimensions of the light beam cross-section. Thus, by combining a plurality of lighting devices in the orthogonal plane, a light beam of high power and of greater elliptical cross-section is obtained for a reduced amount of space used.

FIG. 1 represents in a side perspective a lighting device 100 according to an embodiment of the invention. The lighting device 100 includes a light source 1 and an optical lens 2. The light source 1 comprises a plurality light emitting diodes (LEDs) 10 which are aligned so as to form a line segment. These LEDs 10 are mounted on a support plate 11 comprising holes 12 for fixing the support plate 11 of the light source 1 on a light 1000 for example. The support plate is realized so that the LEDs 10 mounted in one side of the support plate 11 can be connected to a power supply and control electronics on the opposite side.

The optical lens 2 is designed to be attached to a light 1000 by way of fasteners F framing the support plate 11 of the light source 1. The optical lens 2 includes a central optical portion 3 and two peripheral optical portions 4 arranged on either side of the central optical portion 3 in a plane perpendicular to the illuminating plane defined by the line segment formed by the LEDs 10 of the light source 1.

Figure 2:
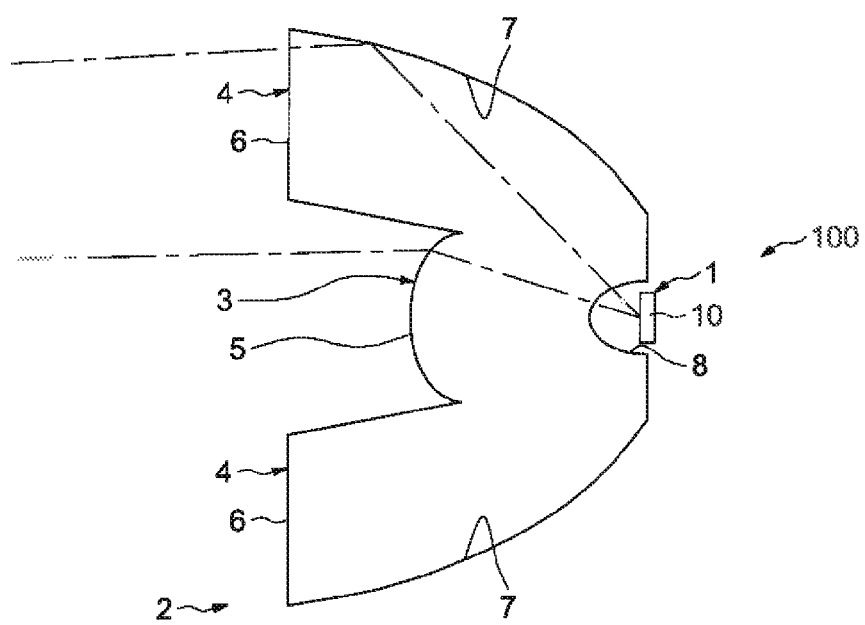
FIG. 2 presents schematically a view in section in a plane orthogonal to the illuminating plane of the lighting device of FIG. 1.
Figure 3:
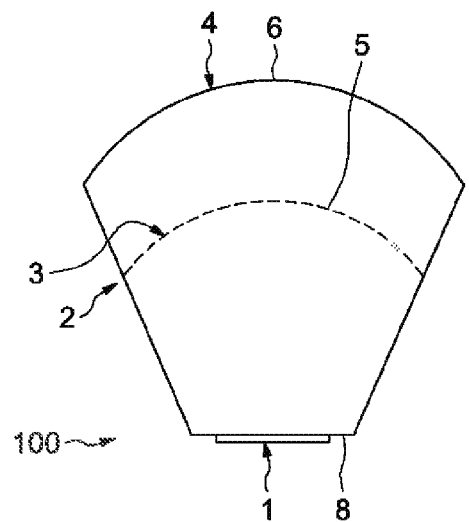
FIG. 3 presents schematically a view in section in the illuminating plane of the lighting device of FIG. 1.
Figure 4:
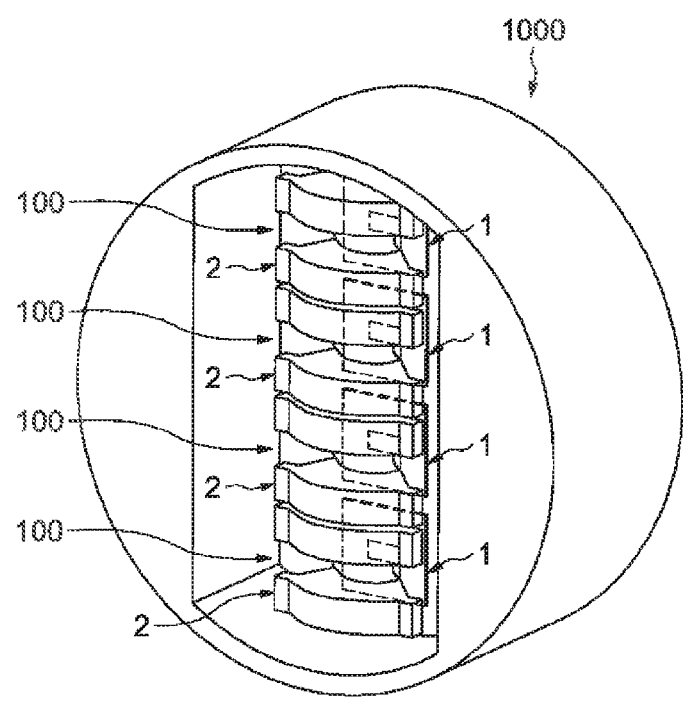
FIG. 4 illustrates a lighting assembly according to an embodiment.

The central optical portion 3 of the optical lens 2 has an aspherical torus shape in the illuminating plane which gives a curvature of the central output surface 5 greater in the orthogonal plane than in the illuminating plane, as illustrated in FIGS. 2 and 3.

FIGS. 2 and 3 present schematically the lighting device 100 of FIG. 1 respectively in a sectional view in a plane orthogonal to the illuminating plane, and in a sectional view in the illuminating plane. On FIG. 2, two examples of light rays emitted by the light source 1 are shown in dotted lines.

The curvature of the central optical portion 3 being greater in the plane perpendicular to the illuminating plane, the convergence of the beam is greater in the plane perpendicular to the illuminating plane. The point of convergence in the illuminating plane is therefore further away from the light source 1 than the point of convergence in the orthogonal plane. Thus, in the point of convergence of the orthogonal plane the light beam will approximate a line segment. Ahead of this orthogonal plane focal point, the light beam may have an elliptically shaped cross-section having a smaller dimension in the orthogonal plane than in the illuminating plane.

As illustrated in FIGS. 1 to 3, the peripheral optical portions 4 of the optical lens 2 each include an peripheral output surface 6 and a reflective surface 7.

The peripheral output surface 7 has a cylindrical convergent lens shape in a plane parallel to the illuminating plane. The peripheral output surface 7 thus deflects the light beam in transmission by making the light beam converge in a plane parallel to the illuminating plane. As illustrated in FIG. 3, the curvature of the peripheral output portion 7 in a plane parallel to the illuminating plane is similar and can be identical to the curvature of the central optical portion 3 shown in dotted lines on FIG. 3 in the illuminating plane. Therefore the convergence of the light beam in planes parallel to the illuminating plane may be the same or is relatively similar to the convergence of the light beam in the illuminating plane performed by the central optical portion 3. The cylindrical diopter shape of the peripheral output surface 7 may, in some embodiments, provide a very small deviation of the light beam in the orthogonal plane.

Each reflective surface 7 may have a semi-parabolic shape in the orthogonal plane and is mounted between the light source 1, and more particularly the support plate 11 and the corresponding peripheral output surface 7. Each reflective surface 7 may be constructed so as to reflect the light beam from the light source 1 towards the corresponding peripheral output surface 6. Thus the reflective surfaces 7 of both peripheral optical potions 4 form together a parabolic reflecting lens.

The optical convergence of the light beam emitted by the LEDs 10 of the light source 1 is thus produced, for the part of the light beam not passing through the central optical portion, by the reflective surfaces 7. The reflective surfaces 7 may be formed so that the focal point of the parabolic reflecting lens formed by the two reflecting surfaces 7 may correspond substantially to the focal point in the orthogonal plane of the central optical portion 3.

The optical lens 2 comprises an entrance surface 8. The lens 2 is assembled on the light 1000 or directly with the plate so as to face the aligned LEDs forming the light source 1. The entrance surface 8 is formed to deflect as little as possible the light beam emitted by the LEDs 10. For this, the entrance surface 8 has a cylindrical shape whose axis is defined by the line of LEDs 10.

Such a lighting device 100 may reduce the amount of space used because of the small size of the LEDs 10 and, therefore, the space used by the associated optical lens. To increase the emitted light power it is possible to mount several lighting devices 100 in a light 1000.

FIG. 5 illustrates a lighting assembly 1000 such as a Runway Turn-Off light for an aircraft, comprising a plurality of lighting devices 100 of FIG. 1. The lighting devices 100 of FIG. 5 may be assembled so as to be aligned in the orthogonal plane. The resulting light beam thus comprises an elliptical cross-section having a small radius in the orthogonal plane and a large radius in a plane parallel to the illuminating planes of the lighting devices 100. The size of the small radius of the light 1000 may be greater than that for a single lighting device 100.

In addition, by feeding the light sources 1 of the lighting devices 100 of the light 1000 in parallel, it is possible to overcome the failure of one of the lighting devices 100. Indeed, the light 1000 continues to operate with a slightly reduces light power.

The embodiments described herein provide a lighting assembly such as a light comprising a plurality of lighting devices using LEDs as a light source and a specific appropriate optical element, thereby reducing the power consumption, extending the life of the light before replacing the light source, reducing the amount of space used, and overcoming at least partially the failure of a lighting device.

The various methods as illustrated in the figures and described herein represent exemplary embodiments of systems and methods. The systems and methods may be implemented manually, in software, in hardware, or a combination thereof. The order of any method may be changed, and various elements may be added, reordered, combined, omitted, modified, etc. Additionally, various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A lighting device, comprising:
   a light source; and
   an optical element,
   wherein the light source comprises a plurality of light emitting diodes aligned, and wherein the optical element is shaped to focus a light beam emitted by the light source in a plane orthogonal to the line of light emitting diodes and to deflect said light beam parallel to an illuminating plane comprising the line of light emitting diodes so as to form a light beam having an ellipsoidal section.

2. The light device of claim 1, wherein the optical element comprises an entrance surface and at least two output surfaces, and has a general converging lens shape in the orthogonal plane.

3. The light device of claim 1, wherein the optical element comprises a central optical portion and two peripheral optical portions arranged on either side of the central optical portion in the orthogonal plane.

4. The light device of claim 3, wherein the central optical portion comprises a central output surface having an aspherical torus shape in the illuminating plane and capable of transmitting the light beam.

5. The light device of claim 1, wherein each peripheral optical portion comprises a peripheral output surface having a cylindrical convergent lens shape in a plane parallel to the illuminating plane and capable of transmitting the light beam, and a semi-parabolic reflective surface in the orthogonal plane capable of reflective the light beam from the light source towards the peripheral output surface, the reflection surfaces of the two peripheral optical portions together forming a parabolic reflecting lens.

6. The light device of claim 1, wherein the optical element comprises an entrance surface and at least two output surfaces, and has a general converging lens shape in the orthogonal plane wherein the entrance surface has a cylindrical surface in the illuminating plane.

7. A lighting assembly, comprising:
   a plurality of lighting devices, wherein at least one of the light devices comprises:
   a light source; and
   an optical element,
   wherein at least one of the light sources comprises a plurality of light emitting diodes aligned, and wherein the optical element is shaped to focus a light beam emitted by the light source in a plane orthogonal to the line of light emitting diodes and to deflect said light beam parallel to an illuminating plane comprising the line of light emitting diodes so as to form a light beam having an ellipsoidal section,
   wherein at least one of the lighting devices is aligned in said orthogonal plane.

* * * * *